Feb. 7, 1956
H. R. CANFIELD
2,733,557
MULTISTONE HONES
Filed Sept. 17, 1954
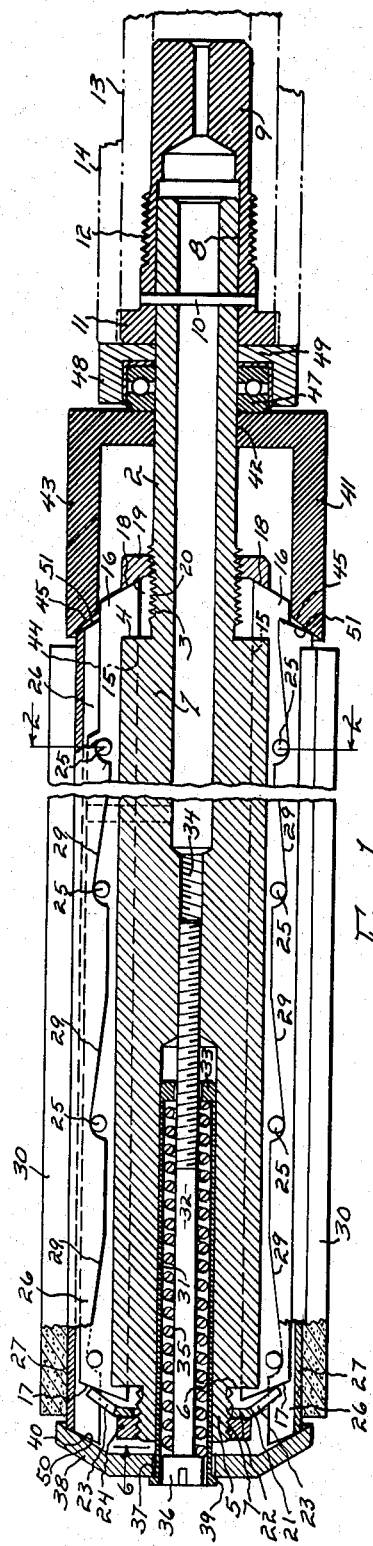
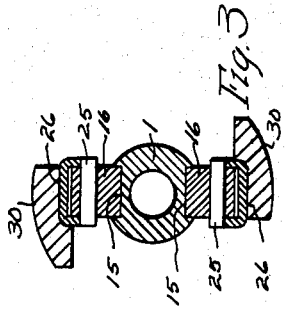
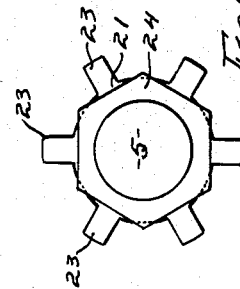
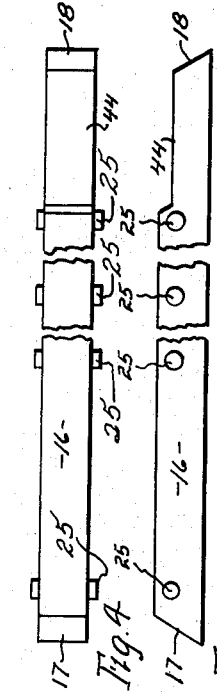
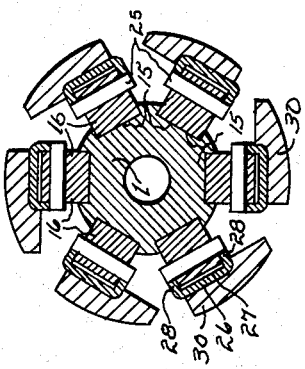
INVENTOR.
Harry R. Canfield

2,733,557

MULTISTONE HONES

Harry R. Canfield, Cleveland Heights, Ohio, assignor to Lempco Products, Inc., Bedford, Ohio, a corporation of Ohio Application September 17, 1954, Serial No. 456,647

6 Claims. (Cl. 51—184.3)

This invention relates to expansible abrading tools of the expansible hone class.

Expansible hones are known comprising, generally, a central spindle for mounting upon a power operated machine to be rotatably driven; and abrading stones at the sides of the spindle rotatable therewith and having, severally, abrading portions, which jointly provide a cylindrical abrading surface.

The stones are generally mounted upon shoes; and a camming mechanism acting upon the shoes, is provided to move the shoes and therewith the stones, laterally of the spindle, to expand or contract the diameter of the cylindrical abrading surface.

The hone hereof is of this general type.

As such hones have been applied to more and more uses, in the arts, demand has arisen for hones of smaller and smaller abrading diameter.

This has been met to some extent by providing two diametrically opposite shoes and stones, and nesting or intermeshing or overlapping the shoes with a rectangular spindle to reduce the diameter of the parts radially inward of the stones; as shown for example in the patent of Jack F. Smole and Arthur Collier, No. 2,663,124.

Such two-stone hones can readily be made to dispose the stones equally distant from the axis of rotation and to require little truing up to a cylindrical surface, and in some arts such hones perform sufficiently accurate and smooth operations.

However, in other arts, a higher degree of accuracy and refinement generally is demanded of the honing operation, than is possible with two stones; and can only be met by providing more than two stones to provide an abrading surface that is more nearly a complete cylinder.

This, however, introduces the problems of disposing all of the stones equally distant from the axis and of keeping the diameter of the cylindrical abrading surface down to the desired minimum in spite of the fact that the correspondingly greater number of stones and the more complex camming mechanism to operate them, must all be disposed in the space between the stones and the spindle; and that in any obvious arrangement, such multiplication of parts takes up more of that space.

One object of the present invention is to provide a multi-stone hone that solves these problems.

The hone of the present invention may be considered as a further development of the hone of the aforesaid patent. The spindle, instead of being rectangular, is formed from around stock; and has radially extending ribs or guides thereon, provided by cutting longitudinal grooves in the stock in the form of keyways and by guides in the form of keys seated in the keyways; the keys being spaced circumferentially and parallel; each key constituting a guide for a channel form sheet metal stone carrying shoe; to guide it for both radial and longitudinal movement.

A longitudinal series of cam followers are provided on each key, upon which cam surfaces on the shoes react to move the shoes apart radially and in unison or, alternatively, to allow the shoes to be retracted inwardly, as the shoes are moved in alternate directions longitudinally and are concurrently held yieldably inward toward the spindle to keep the camming parts engaged.

The construction is particularly applicable to hones having a multiciplicity of stones, such as six or more, to solve the aforesaid problem; but the advantages may be had with fewer stones or with only two.

It is therefore among the objects of the invention to provide a construction of hone adaptable to comprise any desired number of stones and camming mechanisms in the minimum of diametrical space; and which admits of cheap manufacture and assembly without sacrifice of accuracy of the honing operation performed thereby.

The aforesaid keyway and key feature of the construction, allows for ready removal and replacement of the keys, as well as of the stone carrying shoes, whereby after wear they may be readily removed and replaced by new ones; thus prolonging the life of the main part of the hone indefinitely.

In the preferred form, the cam followers are in the form of pins projected through the keys, and the keys with the pins in them may be made and assembled as a separate unit which facilitates manufacturing thereof with accuracy.

It is therefore another object of the invention to provide a hone of the type referred to having cam followers and cams, and in which both the cam followers and the cams are readily removable for replacement after wear.

Other objects will be apparent to those skilled in the art to which the invention appertains.

The invention is fully disclosed in the following description taken in connection with the accompanying drawing, in which:

Fig. 1 is a longitudinal section view of a hone embodying the invention; and

Fig. 2 is a cross sectional view taken from the plane 2—2 of Fig. 1; the construction providing six honing or abrading stones;

Fig. 3 is a view corresponding to Fig. 2, but showing that the hone may have as few as two stones;

Figs. 4 and 5 are respectively top plan and side elevational views of a cam follower carrying key element of Figs. 1 to 3;

Fig. 6 is a sectional view from the plane 6 of Fig. 1 showing a clamping washer or element; parts behind the section plane being omitted to simplify the drawing;

Fig. 7 is a view similar to a part of Fig. 1, illustrating a modification.

Referring to the drawing, there is shown at 1 a spindle body made from round bar stock, turned down to provide a long shank 2 at the right end, with threads 3 thereon, the turning down operation leaving a shoulder 4. By a similar turning down operation, a short shank 5 is provided at the left end leaving a shoulder 6 and the short shank is threaded at 7.

The long shank 2 fits at its end into a bore 8 in a head 9 and is secured therein by a transverse pin 10. The head 9 has a flange 11 at its inner end, and threads 12 on an intermediate portion. The head may be screwed into a threaded hole in the end of the spindle of a hone driving machine indicated at 13, and the flange may be pulled tight against the end of the spindle; whereby the hone spindle body 1 is rigidly mounted on the machine spindle 13 to be rotatably driven thereby, on a spindle axis.

The machine spindle 13 has a sleeve 14 reciprocable thereon as a part of the machine to operate the hone as will be described.

Six shallow longitudinal parallel keyways 15—15 are cut in the outer surface of the round stock body 1, open at their ends at the shoulders 4 and 6, which facilitates cutting them.

Six keys 16—16 all alike, one being shown separately in Figs. 4 and 5 are made of rectangular section stock of a thickness to substantially fit in the keyways 15 and are seated in the keyways and are long enough to extend at both ends beyond the shoulders 4 and 6; and the ends are finished off at an inclination or bevel as shown at 17—18. A nut 19 is screwed on the thread 3 and has a concavely conical face as indicated at 20 against which the right ends of the keys 16 abut.

At the left end, a clamping washer 21 having a central perforation 22 is telescoped over the short shank 5; and is of dished form as shown and its periphery engages the left ends 17 of the keys 16. The washer has peripheral tongues 23, see Fig. 6, and is rotatively disposed so that each tongue engages the end of a key. A clamping nut 24 is screwed on the thread 7 and the keys 16 are thereby clamped between the conical surface 20 of the nut 19 and the washer 21. The washer 21 is of metal of such thickness that the tongues 23 while affording the desired clamping pressure will yield slightly resiliently and individually under the clamping pressure to insure that all of the keys will be tightly clamped.

By virtue of the end bevels 17—18 on the keys, and the engagement thereof with the conical face 20 of the nut 19 and the tongues 23 of the washer 21, the keys, when clamped as aforesaid, will all be uniformly drawn inwardly radially and tightly seated upon the bottoms of the keyways 15, and thereby held upright or radial in the keyways and held from longitudinal shifting, without the necessity of providing a tight fit of the sides of the keys in the keyways.

On each key 16 is a longitudinal series of cam followers in the nature of projections extending laterally from the sides of the keys. In the preferred form illustrated, these cam followers are in the form of straight round pins 25—25 projected through and drivingly fitting in corresponding holes in the key and protruding from opposite sides thereof.

The pins 25 are so disposed in the keys that when the keys are in clamped position as described, each pin has its own axis in a plane at right angles to the axis of the spindle body and at right angles to a radius from the spindle axis in that plane; all of the pins are equally distant from the spindle axis; and the longitudinal spacing of the pins from each other and from the end of the key (say the right end as viewed) is the same for all of the keys.

To this end, the keys 16 with their cam follower pins 25 are all made separately, as illustrated in Figs. 4 and 5, and can thereby all be readily made alike with small tolerances; and may be made in quantities for economy and later assembled with hone spindles.

A channel-shaped stone carrying shoe 26 having a channel web 27 and channel flanges 28—28 is straddled over each key 16.

The edges of the channel flanges 28—28 are cut out or notched to provide longitudinally spaced inclined cam surfaces 29—29. The cam surfaces 29 engage the protruding ends of the cam follower pins 25. The disposition of the pins being alike for all of the keys 16, the shoes 26—26 are all made alike and disposed alike on the shoes.

The inclination of the cam surfaces 29 is in the direction to cause the shoes 26 to move radially away from the spindle axis upon movement of the shoes longitudinally toward the left as viewed, and by equal increments for all of the shoes upon equal longitudinal movement of the shoes.

Six abrading or honing stones 30—30 are mounted respectively on the webs 27 of the six shoes, by suitable adhesive as well understood in the art.

The shoes 26 are all held normally toward the right by the following means.

An elongated cup 31 is mounted reciprocably in a corresponding coaxial bore in the left end of the spindle body 1. A screw 32 extends axially in the cup 31 and passes through a perforation in the cup bottom 33 and is threaded into a small coaxial threaded bore 34 in the spindle. A compression spring 35 within the cup 31 surrounds the screw 32 and abuts at its ends upon the cup bottom 33 and upon a head 36 on the screw.

The outer end of the cup 31 projects out of the spindle and passes through a perforation 37 in a washer 38, and beyond the washer has a flange 39 that overlaps the periphery of the perforation 37. The washer is circular and overlaps the ends of all of the shoes 26 and has a concavely conical face 40 engaging them.

The spring 35 pushes on the cup 31 and washer 38 and yieldingly pushes on the left ends of all of the shoes 26.

At the right hand end of the structure, a cup 41 of circular cross section has a central perforation 42 in its bottom through which the shank 2 slidingly extends, so that the cup can slide along the shank. The skirt 42 of the cup 41 telescopes over the ends of the keys 16 to guide its sliding movement, and a guide surface 44 may be provided on each of the keys for the purpose.

The annular end of the cup skirt 43 is concavely conical as at 45. The adjacent ends of the shoes 26 abut upon the conical surface 45 of the cup and are held in yieldable engagement with it by the spring 35 as aforesaid.

The bottom 46 of the cup 41 abuts upon a thrust ball bearing 47 housed in a shallow cup 48 having a cup bottom 49, both surrounding the shank 2 and slidable therealong, the cup bottom 49 normally engaging the flange 11.

The opposite ends of the shoes 26 are bevelled as at 50 and 51 to substantially fit upon the conical surfaces 40 and 45 described above; but preferably the bevel angle of these ends 50 and 51 is slightly more obtuse (with respect to the spindle axis) than the cone angles of the surfaces 40 and 45, as shown, so that actual contact is at the ends of the shoe channel webs 27—27. In some cases, it may be desirable to form the shoe ends conical to more completely engage the conical surfaces 40 and 45.

By the foregoing means, the action of the spring 35 upon the washer 38 holds the shoes 26 toward the right as viewed and in pressure engagement between the conical surfaces 40 and 45 and exerts force on the opposite ends of the shoes yieldingly holding the shoes inwardly radially and holding the cam surfaces 29 against the cam follower pins 25, but allowing the shoes to be moved outwardly radially when the shoes are moved longitudinally toward the left (as will be described) by the camming action aforesaid; and the spring 35 also holds the cup 41 toward the right and holds its bottom 46 upon the ball bearing 47, and the bearing upon the cup bottom 49 and the cup bottom against the flange 11.

When as referred to above, the sleeve 14 of the driving machine is reciprocated toward the left in the operation of the machine, it engages the cup bottom 49 and moves it toward the left and communicates the movement through the ball bearing 47 and cup 41 to the shoes 26 moving them toward the left and carrying the washer 38 with them against the tension of the spring 35, and the cam surfaces 29 acting on the cam follower pins 25 move the shoes outwardly radially in unison, the ends of the shoes sliding on the surfaces 40 and 45.

Upon withdrawal of the machine sleeve 14, the spring 35 retracts the shoes longitudinally and inwardly as will now be understood.

By means of two nuts 24 and 19 at the opposite ends of the keys 16, the longitudinal position of all of the keys, and of the pins therein may be adjusted as will be understood.

By the modification of Fig. 7, it is shown that instead of the right hand key-clamping nut 19, a collar or flange 52 may be formed on the spindle body 1, and the right ends of the keys 16 may abut thereon and be held there-against by the clamping action of the other nut 24 and, where said adjustment by two nuts is not wanted, this arrangement may be preferred.

The invention makes possible a multi-stone hone of the maximum number of stones for the minimum diameter, limited only by the number of keyways that can be cut in the spindle body and still leave some stock between them. However, the simplicity and cheapness of the construction may also be enjoyed in hones of large diameter.

The advantages of the invention are perhaps more completely developed in a multi-stone hone, but are applicable to a hone with fewer stones, or even two stones, one advantage being that some of the parts such as the keys 16 and shoes 26 made and stocked in quantity for the multi-stone type may be used in even a two stone type; and a two stone hone has therefore been shown in cross section only, in Fig. 3, as embodying the invention; and a comparison of Fig. 3 with Fig. 2 will make its construction apparent without further description, in view of some reference characters in Fig. 3 identifying like parts of Fig. 2.

Both the stone carrying shoes and the keys can be readily removed for replacement in case of wear to renew not only the stones but also both the cams and cam followers.

Some of the details of the structure above described may be changed or modified, as will occur to those skilled in the art and the invention is comprehensive of all such, that come within the scope of the appended claims.

I claim:

1. An expansible hone comprising an elongated spindle body; a plurality of longitudinal parallel keyways in the outer surface of the spindle body, spaced apart circumferentially; a key in each keyway seated on the keyway bottom; a longitudinal series of cam followers projecting laterally from each key; means on the spindle body operable to draw the said keys tightly upon the keyway bottoms to mount them on the spindle body; an elongated stone carrying shoe for each key, having a longitudinal series of cam surfaces respectively engaging the projecting cam followers of the key; spring actuated means yieldably holding the shoes toward the spindle body and holding the cam surfaces in engagement with the cam followers; longitudinally reciprocable means carried by the spindle body engaged with the ends of the shoes and operable to reciprocate the shoes longitudinally in unison to cause them to reciprocate radially by camming action of the cam surfaces and cam followers; the shoes formed to be guided radially and longitudinally by the keys.

2. An expansible hone comprising an elongated spindle body; a plurality of longitudinal parallel keyways in the outer surface of the spindle body, spaced circumferentially, and the bottoms of the keyways being equidistant radially from the spindle axis; a key in each keyway having an edge seated on the keyway bottom; longitudinally spaced cam followers projecting from the sides of the keys; the longitudinal spacing of the cam followers of each key being the same as that of the others; means on the spindle body engaging opposite ends of the keys, and operable to draw the said key edges tightly upon the keyway bottoms; an elongated sheet metal stone carrying shoe for each key and having a longitudinal series of cam surfaces respectively engaging the projecting cam followers of the key; spring actuated means yieldably holding the shoes toward the spindle axis and holding the cam surfaces in engagement with the cam followers; longitudinally reciprocable means carried by the spindle body engaged with all of the shoes and operable to move them longitudinally in unison to cause them to reciprocate radially by camming action of the cam surfaces and cam followers, and the shoes formed to be guided longitudinally and radially by the keys.

3. An expansible hone comprising an elongated spindle body; a plurality of longitudinal parallel keyways in the outer surface of the spindle body, spaced circumferentially, and the bottoms of the keyways being equidistant radially from the spindle axis; a key in each keyway having an edge seated on the keyway bottom; cam followers projecting from opposite sides of the keys; the cam followers of all of the keys being equidistant from the said key edge and the longitudinal spacing of the cam followers of each key being the same as that of the others; means on the spindle body engaging opposite ends of the keys, and operable to clamp the keys therebetween and to draw the said key edges tightly upon the keyway bottoms; an elongated sheet metal stone carrying shoe of channel form straddling each key and guided thereby for radial and longitudinal movement of the shoe thereon; and each shoe having a longitudinal series of cam surfaces on the channel flanges respectively engaging the projecting cam followers of the key; spring actuated means yieldably holding the shoes toward the spindle axis and holding the cam surfaces in engagement with the cam followers; longitudinally reciprocable means carried by the spindle body engaging all of the shoes at one end to move them longitudinally in unison to cause them to reciprocate radially by camming action of the cam surfaces and cam followers.

4. The hone described in claim 1 and in which the cam followers are in the form of pins extending into holes in the key.

5. The hone described in claim 3 and in which the cam followers are in the form of pins extending through holes in the key and protruding from opposite sides of the key.

6. An expansible hone comprising an elongated spindle body; a plurality of longitudinal parallel keyways in the outer surface of the spindle body, spaced circumferentially, and the bottoms of the keyways being planar and equidistant radially from the spindle axis; a key of rectangular cross section in each keyway having a planar edge seated on the keyway bottom; cam followers projecting from opposite sides of the keys; the cam followers of all of the keys being equidistant from the said key edge and the longitudinal spacing of the cam followers of each key being the same as that of the others; the opposite ends of the keys being oppositely bevelled; abutments on the spindle engaging the opposite ends of the keys; at least one of the abutments being operably movable to clamp all of the keys therebetween and by means of their bevelled ends, to draw the said key edge tightly upon the keyway bottoms to mount the keys on the spindle; an elongated sheet metal stone carrying shoe of channel form straddling each key and guided thereby for radial and longitudinal movements and having a longitudinal series of cam surfaces on the channel flanges respectively engaging the projecting cam followers of the key; spring actuated means acting on the shoes yieldably holding them toward the spindle axis and holding the cam surfaces in engagement with the cam followers; longitudinally reciprocable means carried by the spindle body engaging all of the shoes at one end to move them longitudinally in unison to cause them to reciprocate radially by camming action of the cam surfaces and cam followers.

References Cited in the file of this patent

UNITED STATES PATENTS

| Number | Name | Date |
|---|---|---|
| 727,000 | Shattuck | May 5, 1903 |
| 1,095,643 | King | May 5, 1914 |
| 2,421,470 | Sunnen | June 3, 1947 |
| 2,663,124 | Smole | Dec. 22, 1953 |
| 2,686,344 | De Veer | Aug. 17, 1954 |